United States Patent [19]
Viertel et al.

[11] Patent Number: 5,411,310
[45] Date of Patent: May 2, 1995

[54] OUTER SUPPORT BRACKET FOR VEHICLE SUN VISOR

[75] Inventors: Lothar Viertel, Altforweiler, Germany; Patrick Welter, La Chambre, France

[73] Assignee: Gebr. Happich GmbH, Wuppertal, Germany

[21] Appl. No.: 285,944

[22] Filed: Aug. 4, 1994

[30] Foreign Application Priority Data

Aug. 9, 1993 [DE] Germany ............... 43 26 661.4

[51] Int. Cl.6 ............................................. B60J 3/02
[52] U.S. Cl. ................... 296/97.9; 248/73; 24/458
[58] Field of Search ............ 296/97.1, 97.9, 97.12; 248/27.1, 73, 220.2; 24/457, 458, 530, 545

[56] References Cited

U.S. PATENT DOCUMENTS

| | | | |
|---|---|---|---|
| 3,253,084 | 5/1966 | Taylor | 248/73 X |
| 3,996,500 | 12/1976 | Coules | 248/220.2 X |
| 4,840,334 | 6/1989 | Kikuchi | 248/73 |

FOREIGN PATENT DOCUMENTS

| | | |
|---|---|---|
| 7813819 | 5/1978 | Germany . |
| 3523135 | 10/1986 | Germany . |
| 3536471 | 4/1987 | Germany . |
| 4110224 | 7/1992 | Japan . |
| 5096953 | 4/1993 | Japan ............... 296/97.9 |

*Primary Examiner*—Dean J. Kramer
*Attorney, Agent, or Firm*—Ostrolenk, Faber, Gerb & Soffen

[57] ABSTRACT

An outer support bracket for a vehicle sun visor outer support shaft having a body with a fastening pin for installation in an opening in the vehicle body and having two arms which define an insertion opening for the outer support shaft for the visor. A cover cap installable over the fastening pin. Angle levers are positioned on the insertion end of the fastening pin, including a first leg extending for insertion into the opening and a second leg extending outward from the fastening pin, such that upon installation of the fastening pin with the first leg into the opening of the vehicle and upon the second legs contacting the body of the vehicle, the angle levers are pivoted so that the first legs lock the angle lever against removal from the opening while the second legs engage the side of the fastening pin. The cover cap is installed over the second legs to hold the second legs to the fastening pin and hold the fastening pin installed in the body opening. A detent nose into recess connection between the cap and the second legs.

18 Claims, 1 Drawing Sheet

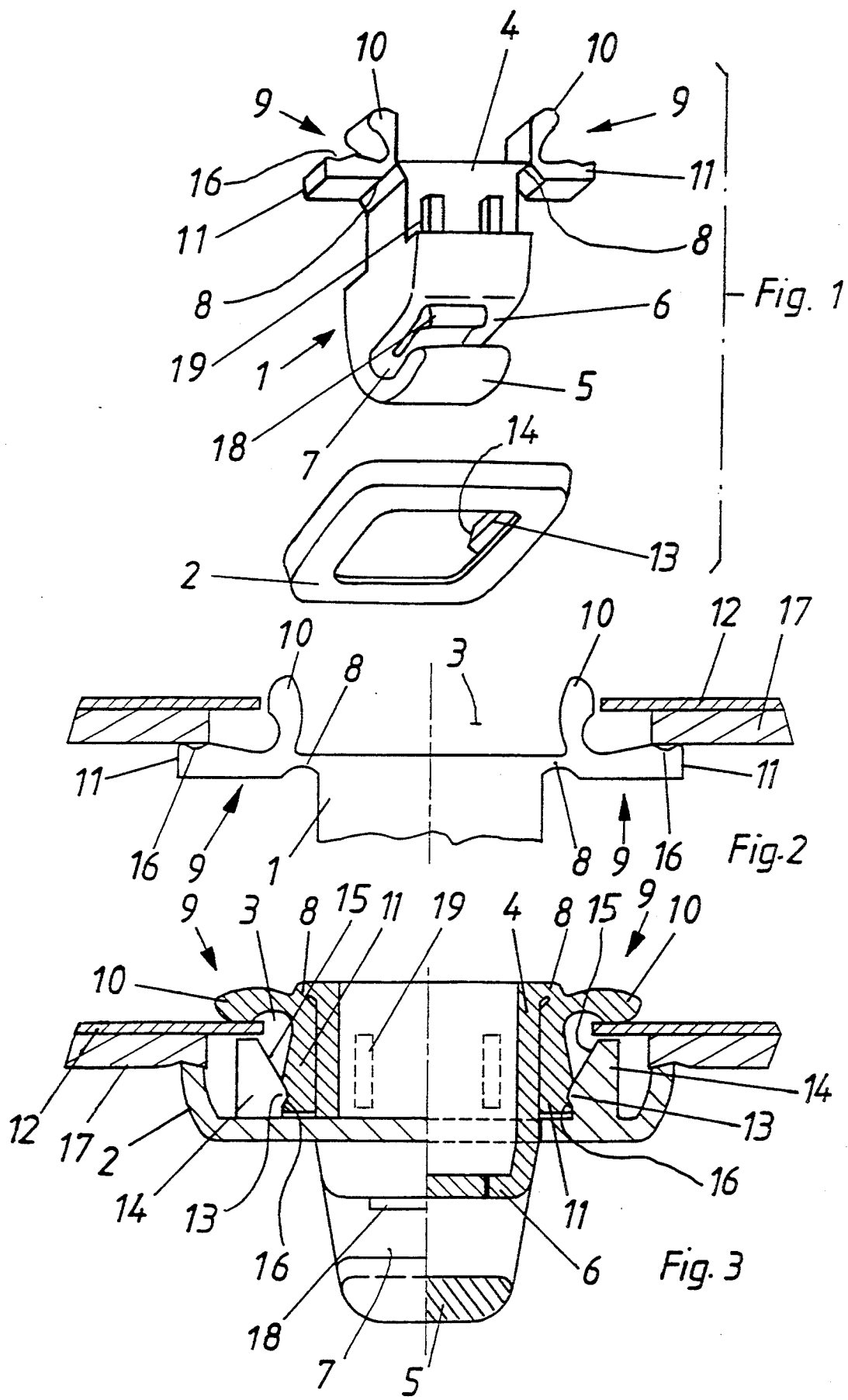

OUTER SUPPORT BRACKET FOR VEHICLE SUN VISOR

BACKGROUND OF THE INVENTION

The present invention relates to an outer support bracket for a vehicle sun visor, wherein the bracket is developed as a plastic injection molded part and has an attachment pin which, in its inserted position, extends through an opening in the vehicle body. The bracket has two arms which engage in the form of a clamp around the outer support shaft of a sun visor. The facing sides of the arms form an undercut support opening for the outer support shaft and form an introduction slot which makes possible the repeated insertion of the support shaft into the support opening.

Outer support brackets of this type are customarily screwed onto a wall or ceiling of the car body. See German Patent Publication 28 03 731 C2. These brackets must be carefully positioned in order to align the attachment screw holes, which is a lengthy and tedious operation. However, the particular disadvantage of the traditional type of attachment is the considerable mounting work required by the necessary screwing work, with resulting expense. Furthermore, the insertion openings for the fastening elements are unattractive and are a source of possible injury, particularly as the edges of the insertion openings generally have relatively sharp edges. In order to obviate this, it is necessary to close each of the insertion openings, as taught in EP Publication 0 005 146 B1, by a cover which is adapted to the cross section of the opening and is formed on the outer support bracket by means of a film hinge. However, this further increases the mounting work.

SUMMARY OF THE INVENTION

The object of the present invention is, accordingly, to provide an outer support bracket of the aforementioned type which can be mounted rapidly and easily, while being comparatively simple and inexpensive to manufacture.

An outer support bracket of the invention has a fastening pin which is provided, at the region of its free end, with two generally opposite angle levers, which are swingable on the fastening pin, e.g. by means of film hinges. The first leg of each angle lever extends beyond the free end of the pin in the direction of the pin. The second leg of each angle lever is inclined to and particularly is transverse to the first leg. The angle levers are swingable, e.g. by 90°, through insertion of the fastening pin into the opening in the car body. The swinging of the lever moves the first legs to engage behind the sheet metal of the body and brings the second legs to rest against the fastening pin. This locks the fastening pin in the car body. The angle levers are adapted to be locked in this position by a cover cap which can be pushed over the fastening pin. The cap is developed with detent noses which engage in detent recesses in the second legs of the angle levers.

The invention easily fastens the outer support bracket to the sheet metal of the car body such that the fastening pin is introduced into the opening in the body and the cover cap is then pushed past the legs of the angle levers onto the fastening pin.

In order not to have to hold the outer support bracket fast when placing on the cover cap and so as to exclude excessive pressing against the outer support bracket, stop cams which limit the path of insertion can be developed on the fastening pin in one embodiment. Then the fastening pin can be introduced into the opening in the car body only until the stop cams engage the metal sheet of the body.

Furthermore, it is advantageous for the cover cap to also be developed as a plastic injection molding and for the detent noses to be formed integrally on that molding. In this case, the detent noses can be arranged on cross members which are formed on the top side or leading side of the cap and have run-on bevels for gripping over the second legs of the angle levers. These measures permit of simple, particularly inexpensive manufacture and furthermore simplify mounting.

Other features and advantages of the present invention will become apparent from the following description of the invention which refers to the accompanying drawings.

BRIEF DESCRIPTION OF THE DRAWINGS

FIG. 1 is an exploded perspective view of the outer support bracket with a cover cap of the invention;

FIG. 2 shows the outer support bracket of FIG. 1 in the first stage of the course of its mounting; and FIG. 3 shows the outer support bracket with the cover cap mounted in its final stage on the metal sheet of the car body.

DETAILED DESCRIPTION OF THE INVENTION

The outer support bracket of the invention is of two part construction comprising a base body 1 of plastic and a plastic cover cap 2 which can be attached to the body 1. The upper part of the base body 1 is developed as a fastening pin 4 which can be inserted into an opening 3 in the body of the car. The lower part of the base body 1 has two arms, 5 below and 6 above, which have facing sides that together form both an undercut support opening 7 for the outer support shaft and an insertion slot.

The fastening pin 4 is shaped like the opening 3 in the body of the car and is preferably of non-circular shape, such as square or rectangular. At the region of its free end, the pin 4 has two opposite angle levers 9 formed thereon. The levers are swingably mounted to the pin 4 by film hinges 8. The first legs 10 of both angle levers 9 extend beyond the free end of the pin along the direction of the pin while the second legs 11 each extend transverse to the respective first leg and outward from the pin 4. (See FIGS. 1 and 2). The respective pairs of legs 10 and 11 of the angle levers 9 are arranged at a 90° angle to each other and are connected in the starting position to the fastening pin 4, as shown in FIGS. 1 and 2.

In order to apply the base body 1 to the metal sheet 12 of the car body, it is moved, with the first legs 10 of the angle levers 9 upright and forward, toward the opening 3 in the car body and the pin 4 is introduced into that opening (see FIG. 2). The second legs 11 contact the metal sheet 12 at the edge of the opening 3. This contact swings the levers so that the angle levers 9 shift into the positions shown in FIG. 3 with their first legs 10 engaged behind the metal sheet 12 of the car body. This applies the second legs 11 of the angle levers 9 parallel to each other against the fastening pin 4. Excess pushing in of the pin 4 is prevented by stop cams 19 formed on the fastening pin 4, which engage the sheet metal of the car body and thereby limit the path of insertion.

In order to secure the base body 1 to the car body and to complete the outer support bracket, the cover cap is pushed over the fastening pin 4 from the arm side or outward end of the base body 1. The cover cap 2 has detent noses 13 formed on it and arranged on cross members 14 which are developed on the top of the cap and protrude vertically from the cap, and the cross members have run-on bevel surfaces 15 for gripping over the second legs 11. Upon pushing on the cover cap 2, the run-on bevels 15 of the cross members 14 slide over the free ends of the second legs 11 and force them against the fastening pin 4. The mounting of the cap is complete as soon as the detent noses 13 have dropped into the detent recesses 16 developed on the second legs 11 of the angle levers 9 which firmly locks the base body 1 and the cover cap together. The positions of the noses and cooperating recesses can be exchanged between the legs and the bevels.

If necessary, removal of the cap is also possible by inserting a screwdriver or similar tool between the roof 17 and the application edge of the cover cap 2, and prying the cover cap 2 off.

The cover cap 2 is developed generally in a shell shape. The bottom of the shell is formed with an opening which corresponds to the cross-sectional area of the base body 1. When the cover cap 2 is applied, its free edge rests against the roof lining 17 regardless of whether the roof has a molded roof lining or a stretched roof lining.

As disclosed in German Patent publication 28 03 731 C2, the arm 6 of the base body 1 can have at least one spring tongue 18 which is swingable with spring resilience in the direction toward the plane of application so that the outer support bracket satisfies all technical requirements.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. An outer support bracket for a vehicle sun visor, the bracket comprising a first portion thereof in the form of a fastening pin to be installed in an opening in the body of the vehicle and a second portion which is supported on the pin for supporting the outer support shaft of the sun visor, the second portion comprising two arms which are shaped and oriented for defining a slot into which the outer support shaft of the visor may be laterally slid and removed;

an angle lever which is swingably attached to the fastening pin, the angle lever including a first leg which in the unlocked position of the fastening pin extends generally along the direction of the pin and a second leg generally transverse to the first leg and extending outward from the fastening pin, the first and second legs being so placed that when the fastening pin is installed in the opening in the vehicle body, the first leg also passes into the opening, until the second leg contacts the vehicle body, and the swingable connection of the angle lever to the fastening pin being for enabling the contact of the second leg of the angle lever with the vehicle body and the continued movement of the fastening pin into the body to cause the angle lever to swing with respect to the fastening pin so that upon the swinging of the angle lever, the first leg engages behind the portion of the vehicle body having the opening through which the fastening pin is installed, for retaining the fastening pin in the opening of the vehicle.

2. The outer support bracket of claim 1, wherein the first and second legs of the angle lever are at such a relative angle that when the first leg swings behind the portion of the vehicle body with the fastening pin in the opening, the second leg swings against the fastening pin preventing further pivoting of the angle levers.

3. The outer support bracket of claim 1, further comprising two of the angle levers on the fastening pin at locations around the fastening pin.

4. The outer support bracket of claim 3, wherein there are two of the angle levers at opposite positions around the fastening pin.

5. The outer support bracket of claim 3, wherein respective film hinges swingably attach the angle levers to the fastening pin.

6. The outer support bracket of claim 3, wherein the fastening pin has a non-circular cross section for being supported in the shaped opening in the vehicle body.

7. The outer support bracket of claim 3, further comprising a cover cap which is installable over the fastening pin and around the second legs of the angle levers, when the second legs have been swung toward the fastening pin, for holding the second legs to the fastening pin and for thereby holding the fastening pin in the opening in the vehicle body.

8. The outer support bracket of claim 7, wherein the second legs of the angle levers and the cap have respective cooperating detent elements for detent connection between them when the cap is positioned over the fastening pin and over the second legs of the angle levers.

9. The outer support bracket of claim 8, wherein the detent elements comprise a respective detent recess in each of the second legs and a respective detent nose defined in the cap for engaging the respective detent recess.

10. The outer support bracket of claim 9, wherein the bracket is comprised of a plastic injection molding; the cover cap is also comprised of a plastic injection molding having the detent noses formed integrally thereon.

11. The outer support bracket of claim 9, further comprising cross members formed on the side of the cap which faces toward the angle levers and toward the opening in the vehicle body into which the fastening pin is installed, the cross members having run on bevels thereon shaped and positioned for gripping over the second legs for holding the second legs, the detent noses being defined on the cross members, and the run on bevel preceding the detent noses on the cross members in the direction toward the opening in the body into which the fastening pin is installed.

12. The outer support bracket of claim 3, further comprising a stop on the fastening pin positioned for contacting the vehicle body around the opening therein and halting further insertion of the fastening pin into the opening.

13. The outer support bracket of claim 1, wherein the angle levers are so positioned on the fastening pin that the first legs thereof extend beyond the inserted end of the fastening pin.

14. The outer support bracket of claim 1, wherein the first and second legs are perpendicular to each other.

15. The outer support bracket of claim 14, wherein the angle lever is swingable by 90° upon insertion of the fastening pin in an opening of the body and upon the second leg of the angle lever contacting the vehicle body upon insertion of the fastening pin.

16. The outer support bracket of claim 1, wherein the bracket is comprised of a plastic injection molding.

17. The outer support bracket of claim 1, wherein the two arms of the bracket have respective sides which face toward each other and define an undercut support opening for receiving the outer support shaft.

18. The outer support bracket of claim 1, further comprising a cover cap which is installable over the fastening pin and around the second legs of the angle levers, when the second legs have been swung toward the fastening pin, for holding the second legs to the fastening pin and for thereby holding the fastening pin in the opening in the vehicle body.

* * * * *